United States Patent
Inaba et al.

(10) Patent No.: US 8,950,121 B2
(45) Date of Patent: Feb. 10, 2015

(54) VEHICLE DOOR HEADER AND METHOD OF MANUFACTURING SAME

(71) Applicant: GM Global Technology Operations LLC, Detroit, MI (US)

(72) Inventors: Koichi Inaba, West Bloomfield, MI (US); Rinaldo M. Lucchesi, Rochester Hills, MI (US); James C. O'Kane, Shelby Township, MI (US); Michael G. Poss, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/647,586

(22) Filed: Oct. 9, 2012

(65) Prior Publication Data

US 2014/0096452 A1    Apr. 10, 2014

(51) Int. Cl.
*B60J 5/04*    (2006.01)
(52) U.S. Cl.
USPC .......................... 49/502; 49/475.1; 296/146.9
(58) Field of Classification Search
CPC .... B60J 10/086; B60J 5/0402; B60J 10/0022; B60J 10/04
USPC .................. 49/475.1, 490.1, 495.1, 440, 441, 49/492.1, 493.1, 502; 296/146.5, 146.6, 296/146.9, 1.08
See application file for complete search history.

(56) References Cited

U.S. PATENT DOCUMENTS

| | | | |
|---|---|---|---|
| 6,487,820 B1 * | 12/2002 | Nakajima et al. | 49/490.1 |
| 6,668,490 B2 * | 12/2003 | Hock et al. | 49/502 |
| 7,325,859 B1 * | 2/2008 | Brancaleone et al. | 296/146.9 |
| 7,487,615 B2 * | 2/2009 | Watanabe et al. | 49/441 |
| 2001/0001917 A1 * | 5/2001 | Goto | 49/440 |
| 2001/0017005 A1 * | 8/2001 | Ellis | 49/40 |
| 2002/0078631 A1 * | 6/2002 | Hock et al. | 49/502 |
| 2011/0061307 A1 * | 3/2011 | Braeuherr | 49/475.1 |
| 2012/0091746 A1 * | 4/2012 | Zimmer et al. | 296/93 |
| 2012/0174491 A1 * | 7/2012 | Clark et al. | 49/490.1 |

OTHER PUBLICATIONS

The Doors of the New BMW 5 Series Sedan; Presentation, Oct. 16, 2010, European Automobil-Anbauteile Konferenz; Bad Nauheim, Hesse, Germany.

The Lightweight and Functional Door of the New A8; Presentation, Oct. 11, 2010, European Automobil-Anbauteile Konferenz; Bad Nauheim, Hesse, Germany.

* cited by examiner

*Primary Examiner* — Katherine Mitchell
*Assistant Examiner* — Scott Denion
(74) *Attorney, Agent, or Firm* — Quinn Law Group, PLLC

(57) ABSTRACT

A vehicle door assembly includes a door inner panel that has a header portion that at least partially defines a window opening. A reinforcement panel is configured to abut the door inner panel along the header portion and further defines the window opening. The door inner panel and the reinforcement panel each have a respective first flange extending at least partially outboard and a respective second flange extending at least partially inboard. The first flange of the door inner panel abuts the first flange of the reinforcement panel and the second flange of the door inner panel abuts the second flange of the reinforcement panel. A trim member is secured to the reinforcement panel and to the header portion to cover the second flanges without contacting the second flanges and has an inboard-facing planar portion as a furthest inboard extent of the trim member.

13 Claims, 3 Drawing Sheets

VEHICLE DOOR HEADER AND METHOD OF MANUFACTURING SAME

TECHNICAL FIELD

The present teachings generally include a vehicle door assembly with a door header and a method of assembling a vehicle door header.

BACKGROUND

Aluminum vehicle doors can provide a mass savings in comparison to steel doors. In order to provide an aluminum door header that has comparable structural performance as a steel door header, the door header is typically larger, which can reduce the field of vision of a vehicle occupant.

SUMMARY

A vehicle door assembly has a door header configured to provide reduced mass, increased field of vision, and to enable a relatively low-cost welding process. The door assembly is for a vehicle with a vehicle body that defines a vehicle interior and a door opening. The vehicle body establishes an inboard direction toward the vehicle interior and an outboard direction away from the vehicle interior. The door assembly includes a door inner panel that has a header portion at least partially defining a window opening. A reinforcement panel is configured to abut the door inner panel along the header portion and further defines the window opening. The door inner panel and the reinforcement panel each have a respective first flange extending at least partially outboard and a respective second flange extending at least partially inboard. The first flange of the door inner panel abuts the first flange of the reinforcement panel and the second flange of the door inner panel abuts the second flange of the reinforcement panel.

In one embodiment, the door inner panel is thinner than the reinforcement panel for mass savings. The first flanges are welded to one another by beam welding, such as laser welding or electron beam welding, and the second flanges are also welded to one another by beam welding. In one embodiment, the second flanges are not longer than about 6 millimeters and extend at an angle of about 38 degrees from an inner surface of a window in the window opening. Thus, a relatively low cost welding process is enabled while the flanges are positioned to enable a relatively wide field of vision.

The above features and advantages and other features and advantages of the present teachings are readily apparent from the following detailed description of the best modes for carrying out the present teachings when taken in connection with the accompanying drawings.

DETAILED DESCRIPTION

Figure 1:
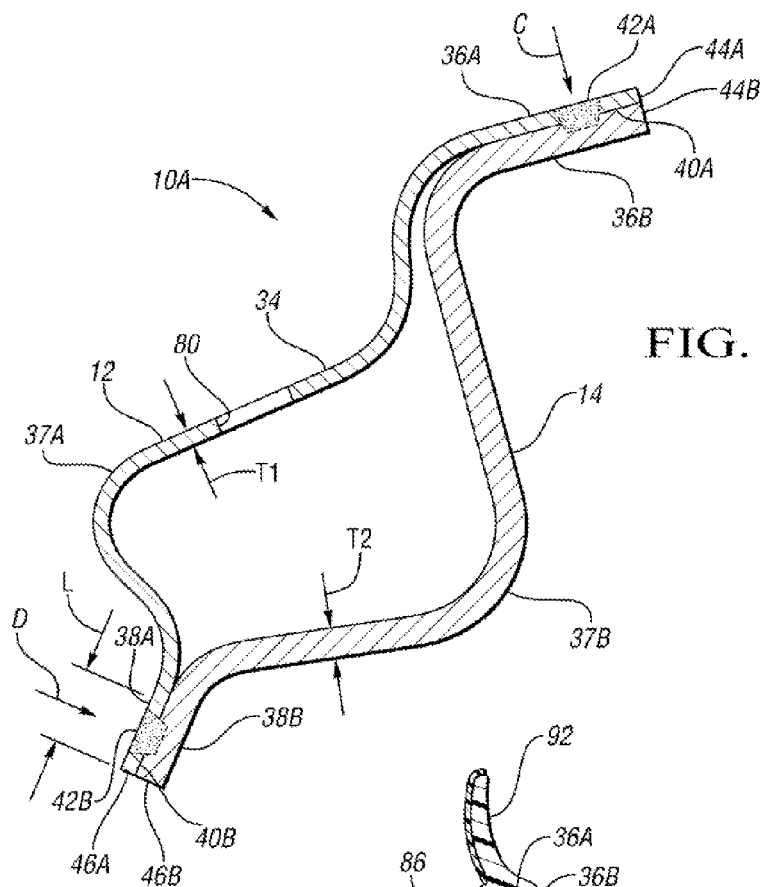
FIG. 1 is a schematic cross-sectional illustration of portions of a vehicle door assembly shown in FIG. 3 as taken at lines 3-3 in FIG. 6.
Figure 6:
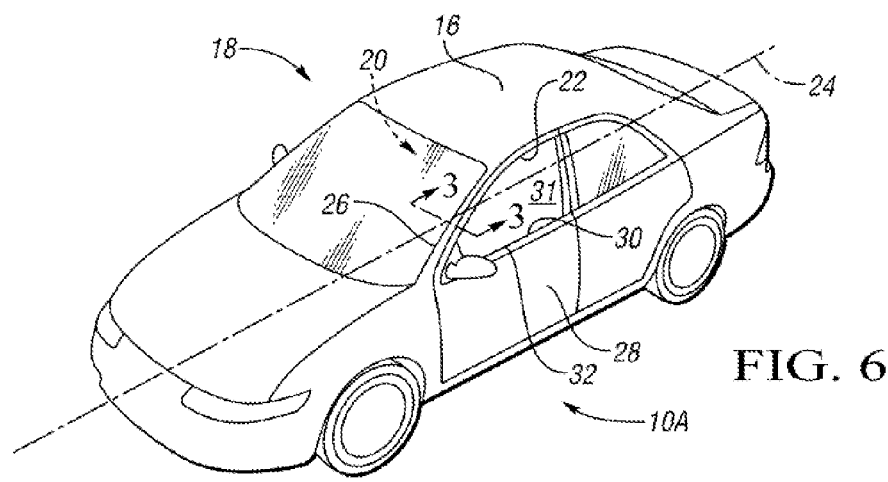
FIG. 6 is a schematic perspective illustration of a vehicle that has the door assembly of FIGS. 1-4.

Referring to the drawings, wherein like reference numbers are used to identify like or identical components in the various views, FIG. 1 shows a portion of a vehicle door assembly 10A. The cross-sectional view of FIG. 1 is shown with additional features in FIG. 3, as taken at the lines 3-3 in FIG. 6. The door assembly 10A includes a door inner panel 12 and a reinforcement panel 14. As used herein, a "panel" is a relatively thin sheet of consistent thickness, but is not limited to a flat sheet. A panel can be stamped or otherwise formed with a complex shape. As shown in FIG. 6, the door assembly 10A is connected to a vehicle body 16 of an automotive vehicle 18. The vehicle body 16 defines an interior space 20, also referred to as a passenger space. The vehicle body also defines a door opening 22 that is closed by the door assembly 10A when the door assembly 10A is in the closed position of FIG. 6. The passenger space 20 is inboard of the closed door assembly 10A, and the surrounding environment is outboard of the door assembly 10A. Stated another way, as used herein, the term "outboard" refers to a location relative to a center of the vehicle 18 along a longitudinal axis 24 that is located further away from an "inboard" location. As such, an inboard location is disposed nearer the center of the vehicle 18 relative to an outboard location, which is disposed farther from the center of the vehicle 18. An inboard direction is any direction at least partially toward the center axis 24. An outboard direction is any direction at least partially away from the center axis 24.

Figure 3:
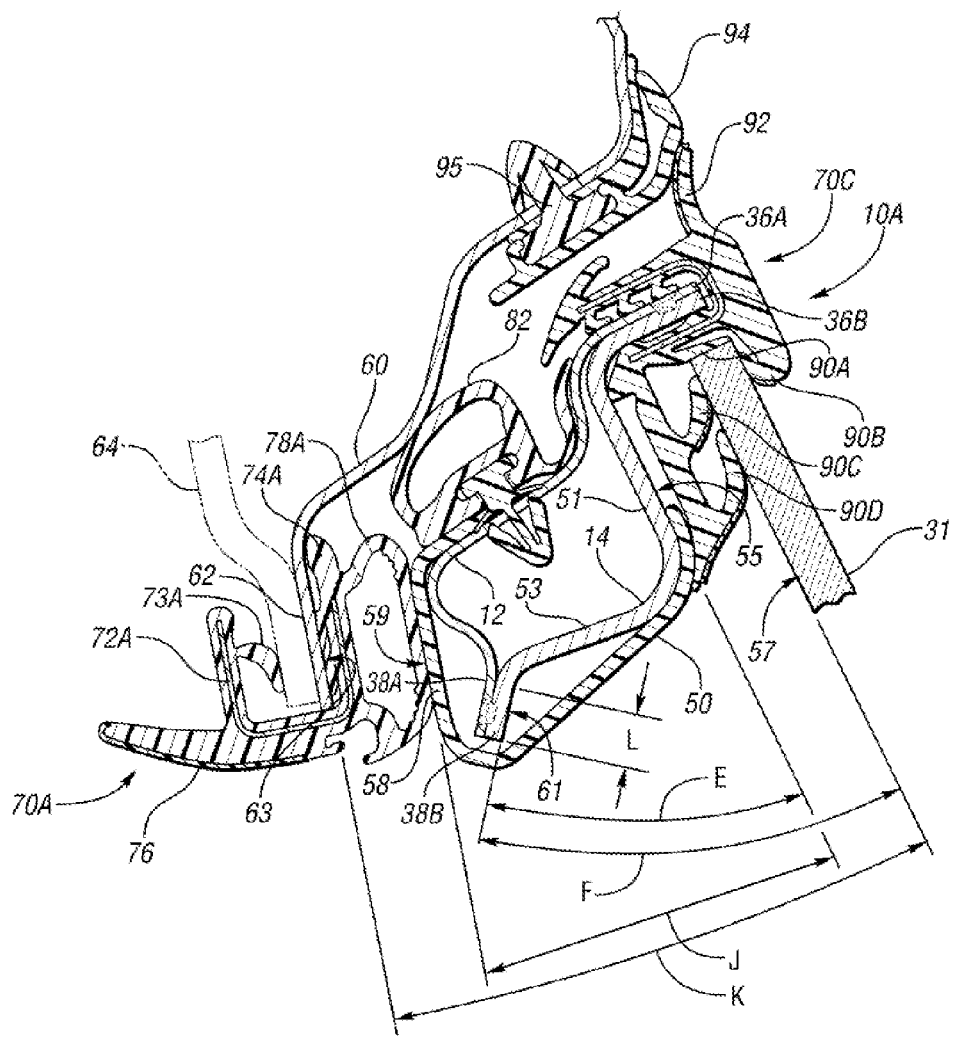
FIG. 3 is a schematic cross-sectional illustration of the vehicle door assembly of FIG. 2 showing the door assembly in a closed position sealed to a vehicle body flange of the vehicle of FIG. 6.

The cross-sectional view of the door assembly 10A of FIG. 3 is taken through an A-pillar 26 as shown in FIG. 6. The inner panel 12 is a relatively large component that generally follows the shape of a door outer panel 28 shown in FIG. 6 to extend around and define a window opening 30. A glass window 31 can be raised and lowered to cover and uncover the window opening 30. The portion of the door assembly 10A above the door sill 32 is generally referred to as a door header portion. The portion 34 of the inner panel 12 shown in FIG. 1 is the door header portion 34 of the inner panel 12.

As indicated in FIG. 1, the door inner panel 12 has a first thickness T1 that is relatively thin in comparison to a second thickness T2 of the reinforcement panel 14. The reinforcement panel 14 is relatively small in comparison to the door inner panel 12 as the reinforcement panel 14 frames the window opening 22, and does not extend significantly below the sill 32. Accordingly, there is a mass savings realized by making the door inner panel 12 relatively thin, such as 1 millimeter (mm) in thickness T1, and the reinforcement panel 14 thicker, such as 2 mm in thickness T2. For increased mass savings, the door inner panel 12 can be aluminum instead of steel. As used herein, "aluminum" includes any suitable aluminum alloy. The reinforcement panel 14 can also be aluminum. Other suitable materials, including steel, can be used instead for the door inner panel 12 and the reinforcement panel 14, and each may be a different material.

The door assembly 10A is configured to be of sufficient strength, while being relatively low cost to assemble and manufacture, and provide a relatively unobstructed field of vision for vehicle occupants. Specifically, the door assembly 10A is configured to enable connection of the header portion 34 of the door inner panel 12 to the reinforcement panel 14 by a beam welding process such as high energy beam welding or laser welding. The header portion 34 of the door inner panel 12 has a first flange 36A, a second flange 38A, and an inboard-bowing portion 37A between the two flanges 36A, 38A. As used herein, a "flange" is a planar portion of a panel extending to a terminal end or edge of the panel. The reinforcement panel 14 also has a first flange 36B, a second flange 38B, and an outboard-bowing portion 37B between the flanges 36B, 38B. The header portion 34 and the reinforcement panel 14 are configured to fit together with the first flanges 36A, 36B abutting one another at an abutment interface 40A and the second flanges 38A, 38B abutting one another at an abutment interface 40B.

The door inner panel 12 and the reinforcement panel 14 can be held to one another in a fixture with the flanges 36A, 36B and 38A, 38B abutting one another as shown in FIG. 1 while a high energy beam weld or a laser weld is applied in a direction C on the first flange 36A and a direction D on the second flange 38A (i.e., in a direction from the thinner inner panel 12 to the thicker reinforcement panel 14). By welding through the thinner panel 12 to the thicker reinforcement panel 14, good weld penetration in the thicker reinforcement panel 14 is enabled. The weld area 42A is shown connecting the first flanges 36A, 36B and the weld area 42B is shown connecting the second flanges 38A, 38B. The electron beam weld or laser beam weld may be along the abutted door inner panel 12 and reinforcement panel 14 around the entire perimeter of the window opening above the door sill 32.

The second flanges 38A, 38B are specifically configured to be of a minimal length L required to enable a secure weld area 42B. Specifically, the length L of the second flanges 38A, 38B is the length along the abutment interface 40B (i.e., the planar extent of the flanges 38A, 38B). Optimally, the length L is 6 mm. Notably, the first flanges 36A, 36B are configured so that outboard terminal ends 44A, 44B of the door inner panel 12 and the reinforcement panel 14 align with one another. The second flanges 38A, 38B are configured so that inboard terminal ends 46A, 46B of the door inner panel 12 and the reinforcement panel 14 align with one another. This alignment may occur along the entire perimeter of the door inner panel 12 and the reinforcement panel 14 (i.e., along the window opening 22 of FIG. 6). No overlap of the door inner panel 12 and reinforcement panel 14 is necessary for beam welding, as would be required for a lap weld. Any such overlap would tend to increase the length of one of the second flanges 38A, 38B, reducing the field of vision from the interior space 20.

Figure 2:
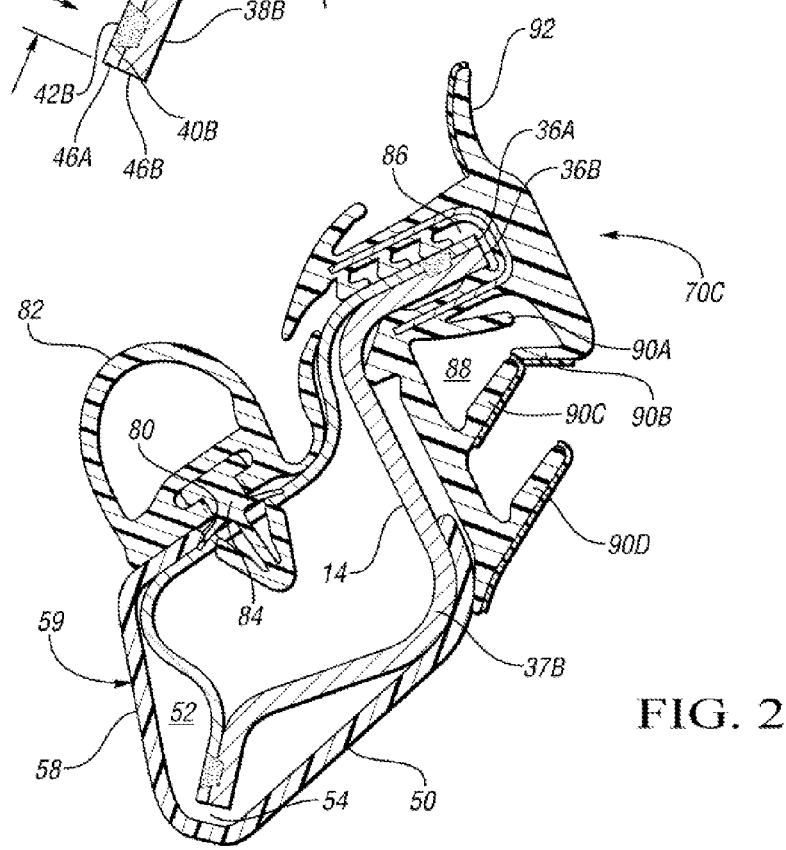
FIG. 2 is a schematic cross-sectional illustration of the vehicle door assembly of FIG. 1 showing trim members and seals.

As shown in FIG. 2, a trim member 50 is fit over the bowed portions 37A, 37B of the door inner panel 12 and the reinforcement panel 14. The trim member 50 may simply be retained to the bowed portions 37A, 37B by an inward bias of the sides of the trim member 50. Adhesive or connectors may also be used to secure the trim member 50 to the door inner panel 12 and the reinforcement panel 14. The inwardly curved sides of the trim member 50 form a channel 52 in which the second flanges 38A, 38B are covered. There is a clearance 54 between the trim member 50 and the second flanges 38A, 38B, increasing the ease of installation of the trim member 50 as assembly tolerances are afforded by the clearance 54. That is, the trim member 54 is spaced from and does not contact the second flanges 38A, 38B.

Figure 4:
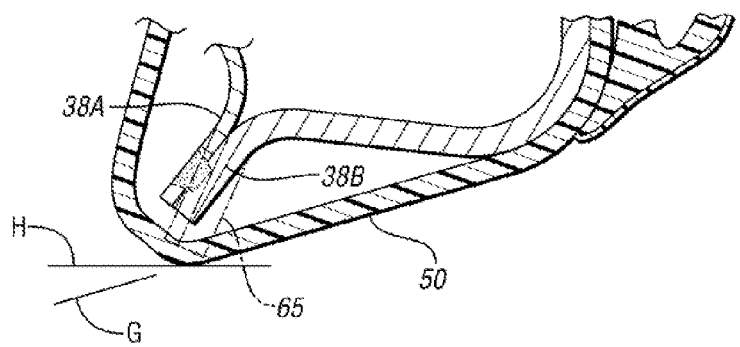
FIG. 4 is a schematic cross-sectional illustration in fragmentary view of a portion of the vehicle door assembly of FIG. 2.

The door inner panel 12, the reinforcement panel 14, and the trim member 50 are configured to improve the field of vision from within the vehicle interior space 20. This is accomplished in part by ensuring that the second flanges 38A, 38B are turned sufficiently inboard to minimize the downward extension of the lowest extent of the trim member 50. Specifically, FIG. 3 shows that the reinforcement panel 14 has a first planar portion 51 extending orthogonally from the first flange 36B and a second planar portion 53 extending from the second flange 38B. The window 31 can be extended to the closed position shown in FIG. 3 in which the window 31 extends partially under the first flange 36B. An outboard-facing surface 55 of the first planar portion 51 is generally parallel with an inboard-facing surface 57 of the window 31. The second flanges 38A, 38B extend partially inboard so that an outboard facing surface 61 of the second flange 38A is at an angle of 38 degrees with respect to the outboard-facing surface 55 of the first planar portion 51, as indicated by angle E in FIG. 3. The same 38 degree angle is also achieved between the outboard facing surface 61 of the second flange 38A and the inboard facing surface 57 of the window 31. With the flanges 38A, 38B turned inboard at the angles E, F (38 degrees), and being of relatively short length L (6 mm), the trim member 50 can cover the flanges 38A, 38B without extending significantly downward, thus improving field of vision. As illustrated in FIG. 4, an example driver's field of vision limit line G and a passenger's field of vision limit line H pass the door assembly 10A from within the interior space 20 of FIG. 6 and are dependent on the lowest extent of the trim member 50. If the second flanges 38A, 38B were at a lesser angle than E or F with respect to the window 31 or the planar portion 51, or were longer than length L, as indicated by phantom lines 65 (showing a less desirable position of the second flanges), then the trim member 50 would necessarily extend lower than shown in FIG. 4 to clear the second flanges, shifting the field of vision limit lines G, H downward and decreasing the overall field of vision of the driver and of the passenger.

As shown in FIGS. 2 and 3, the trim member 50 has an inboard-facing planar portion 58 with an inboard-facing planar surface 59. FIG. 3 shows that body 16 of FIG. 6 has a body outer panel 60 with a body panel flange 62 having an outboard-facing planar surface 63. The planar portion 58 of the trim member 50 is substantially parallel with the planar body panel flange 62. The inboard-facing planar portion 58 is the furthest inboard extent of the trim member 50 when the door assembly 10A closes the door opening 22. A body flange-mounted weather strip 70A is secured to the body outer panel 60 and a body inner panel 64 shown in phantom. The body flange-mounted weather strip 70A includes a carrier 72A and a compliant material forming lip seals 73A, 74A sealing to the body panels 60, 64. A compliant outer layer 76 will seal to interior trim (not shown). The weather strip 70A includes a bulb portion 78A that is partially compressed when the door assembly 10A is in the closed position, as shown in FIG. 3. The parallel arrangement of the flange 62 and the planar portion 58 of the trim member 50 minimizes twisting of the bulb portion 78A to provide a maximum sealing ability for the bulb portion 78A.

The inboard-facing planar surface 59 is at an angle J with respect to the outboard-facing surface 55 of the first planar portion 51 of the reinforcement panel 14. An equal angle exists between the inboard-facing planar surface 59 and the inboard-facing surface 57 of the window 31 due to the parallel arrangement of the window 31 and the planar portion 51. Additionally, the angle K between the outboard-facing surface 63 of the body flange 62 and the inboard-facing surface 57 of the window 31, is about fifteen degrees, and is the same as the angle between the outboard-facing surface 55 and the outboard-facing surface 63 due to the parallel arrangement of the body flange 62 and the planar portion 58. The length L and the angle E of the second flanges 38A, 38B help to enable the orientation of the first planar portion 58 parallel with the body flange 62, improving the sealing of the bulb portion 78A to the planar portion 58.

Figure 5:
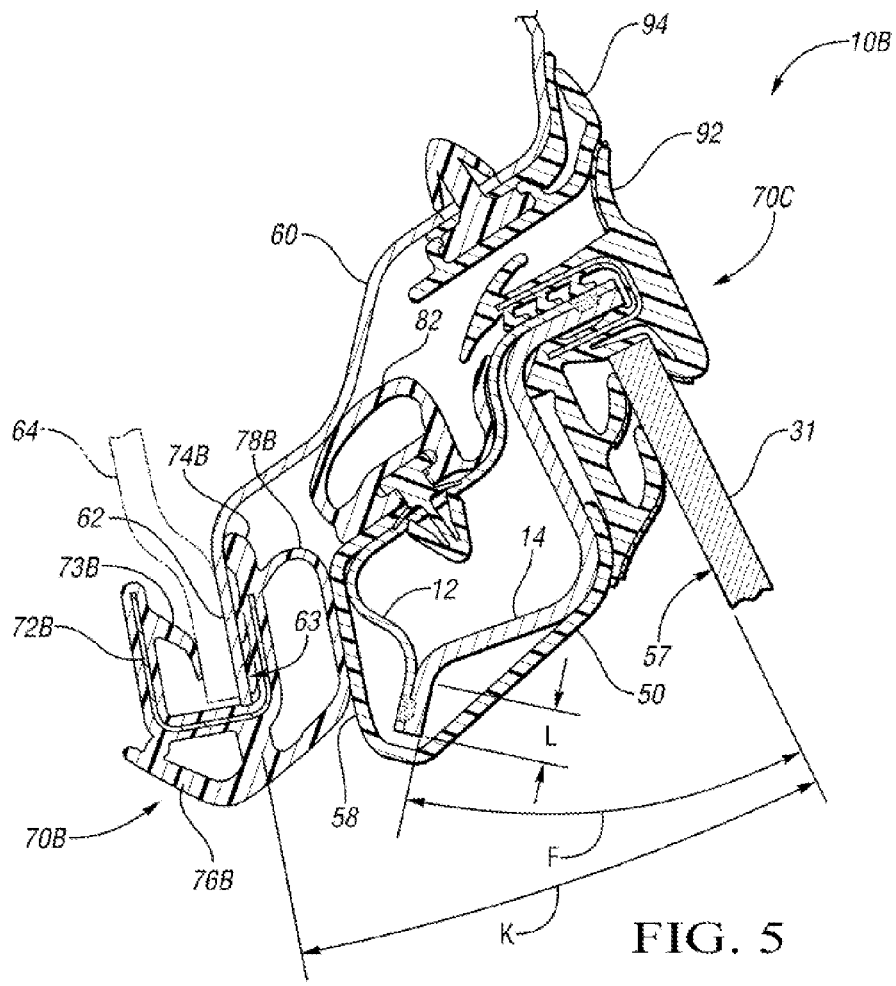
FIG. 5 is a schematic cross-sectional illustration in fragmentary view of the vehicle door assembly of FIG. 2 showing the door assembly in a closed position sealed to a vehicle body flange with an alternative door seal.

The planar portion 58 enables a variety of different body weather strips to be used with the trim member 50. FIG. 5 shows a door assembly 10B alike in all aspects to the door assembly 10A except that a different body flange-mounted weather strip 70B is secured to the body outer panel 60 and the body inner panel 64 shown in phantom. The door body flange-mounted weather strip 70B includes a carrier 72B and a compliant material forming lip seals 73B, 74B sealing to the body panels 60, 64. A portion 76B of the weather strip 70B will seal to interior trim (not shown). The weather strip 70B includes a bulb portion 78B that is partially compressed when the door assembly 10B is in the closed position, as shown in FIG. 3. The parallel arrangement of the flange 62 and the planar portion 58 of the trim member 50 provides a maximum sealing ability for the bulb portion 78B as twisting of the bulb portion 78B is minimized.

Referring again to FIG. 1, the header portion 34 of the door inner panel 12 has an aperture 80. FIG. 2 shows a bulb seal 82 connected to the door inner panel 12 at the aperture 80 with a fastener 84 that extends through the bulb seal 82 and the aperture 80 and secures bulb seal 82 to the header portion 34. There may be several apertures 80 and fasteners 84 along the perimeter of the header portion 34. Alternatively, the bulb seal 80 could be attached to the header portion 34 at a C-channel in the header portion, by adhesive, or by any other suitable manner. FIG. 3 shows that the bulb seal 82 is configured to seal against the outer body panel 60 when the door assembly 10A is in the closed position.

The door assembly 10A has a multi-function seal 70C shown in FIG. 2. The multi-function seal 70C is configured with a first channel 86 and is supported on and at least partially encloses the first flanges 36A, 36B in the first channel 86. The multi-function seal 70C extends along the reinforcement panel 14 between the first flanges 36A, 36B and the outboard-bowing portion 37B and at least partially defines a second channel 88 configured to receive an edge of the window 31, as shown in FIG. 3. The multi-function seal 70C has finger portions 90A, 90B, 90C, 90D extending into the second channel 88 and configured to be sufficiently flexible to seal against the window 31, as shown in FIG. 3. Furthermore, the multi-function seal 70C has a lip seal portion 92 that extends toward and seals against a body molding 94 secured to the outer body panel 60 by a fastener 95. In an embodiment that does not have a body molding 94, the lip seal portion 92 can seal directly to the outer body panel 60.

The design of the door assemblies 10A, 10B discussed above thus enables a relatively low cost method of assembling a vehicle door that includes abutting a header portion 34 of a door inner panel 12 with a reinforcement panel 14. The door inner panel 12 and the reinforcement panel 34 each have a respective first flange 36A, 36B extending at least partially outboard and a respective second flange 38A, 38B extending at least partially inboard. The abutting is done such that the first flange 36A of the header portion 34 abuts the first flange 36B of the reinforcement panel 14 and the second flange 38A of the header portion 34 abuts the second flange 38B of the reinforcement panel 14. Beam welding can then be applied to weld the first flanges 36A, 36B to one another and the second flanges 38A, 38B to one another. A trim member 50 is then connected to the door inner panel 12 and the reinforcement panel 14 such that the second flanges 38A, 38B are within a channel 52 of the trim member 50 without contacting the trim member 50. The second flanges 38A, 38B are a relatively short length that still enables the beam welding, and are angled inboard sufficiently so that the position of the trim member 50 still enables a relatively unobscured field of vision for vehicle occupants.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A door assembly for a vehicle with a vehicle body that defines a vehicle interior and a door opening closable by the door assembly; wherein the vehicle body establishes an inboard direction toward the vehicle interior and an outboard direction away from the vehicle interior, the door assembly comprising:

a door inner panel having a header portion at least partially defining a window opening;

a reinforcement panel configured to abut the door inner panel along the header portion and further defining the window opening; wherein the door inner panel and the reinforcement panel each have a respective first planar flange extending at least partially in the outboard direction and a respective second planar flange extending to terminal ends at least partially in the inboard direction when the door assembly closes the door opening;

wherein the first planar flange of the door inner panel abuts the first planar flange of the reinforcement panel and the second planar flange of the door inner panel abuts the second planar flange of the reinforcement panel;

a trim member secured to the reinforcement panel and to the header portion to cover the second planar flanges without contacting the second planar flanges;

wherein the second planar flanges and the trim member are configured so that the trim member has an inboard-facing planar portion as a furthest inboard extent of the trim member when the door assembly closes the door opening;

wherein the reinforcement panel has a first planar portion directly extending from the first planar flange of the reinforcement panel, a second planar portion directly extending from the second planar flange of the reinforcement panel, and only one outboard-bowing portion between the first and second planar portions; wherein the outboard-bowing portion is a single, continuous arced portion directly connected to the first planar portion and the second planar portion; and wherein the outboard-bowing portion is the furthest outboard extent of the reinforcement panel between the first and second planar flanges of the reinforcement panel when the door assembly closes the door opening.

2. The door assembly of claim 1, wherein a length of the second planar flanges is not greater than about 6 millimeters; and further comprising:

a door window in the window opening having an inboard-facing surface and configured to extend at least partially under the first planar flanges; and wherein the second planar flanges extend at least partially in the inboard direction at an angle of approximately 38 degrees with respect to the inboard-facing surface of the window.

3. The door assembly of claim 1, wherein the second planar flanges extend at least partially in the inboard direction at an angle of approximately 38 degrees with respect to the first planar portion.

4. The door assembly of claim 1, wherein the door inner panel has a first thickness and the reinforcement panel has a second thickness greater than the first thickness;
   wherein the first planar flanges are welded to one another by beam welding; and
   wherein the second planar flanges are welded to one another by beam welding.

5. The door assembly of claim 1, wherein the vehicle body has a body panel flange at least partially defining the door opening; wherein the body panel flange has an outboard-facing planar portion;
   wherein the terminal ends of the second planar flanges are substantially aligned, and a length of the second planar flanges is not greater than about 6 millimeters;
   wherein the header portion forms an inboard-bowing portion between the first and the second planar flanges of the header portion;
   wherein the trim member defines a channel and is secured to the inboard-bowing portion and the outboard-bowing portion to enclose the second planar flanges in the channel;
   wherein the inboard-facing planar portion of the trim member is substantially parallel with the outboard-facing planar portion of the body panel flange when the door assembly closes the door opening; and
   wherein a weather strip is mounted to the outboard-facing planar portion of the body panel flange to seal against the inboard-facing planar portion of the trim member when the door assembly closes the door opening.

6. The door assembly of claim 1, wherein the vehicle body has a body panel flange at least partially defining the door opening; wherein the body panel flange has an outboard-facing planar portion;
   wherein the inboard-facing planar portion of the trim member extends at an angle of about 15 degrees with respect to the first planar portion of the reinforcement panel; and
   wherein the inboard-facing planar portion of the trim member is substantially parallel with an outboard-facing planar portion of the body flange to provide an efficient sealing environment between the inboard-facing planar portion of the trim member and the outboard-facing planar portion of the body panel flange.

7. The door assembly of claim 1, further comprising:
   a door window in the door opening;
   a multi-function seal configured with a first channel and supported on and at least partially enclosing the first planar flanges in the first channel; and
   wherein the multi-function seal extends along the reinforcement panel between the first planar flanges and the bowed portion and at least partially defines a second channel configured to receive the window.

8. The door assembly of claim 7, wherein the multi-function seal has finger portions extending into the second channel and configured to seal against the window.

9. The door assembly of claim 7, wherein the multi-function seal has a lip seal portion that extends toward and seals against the vehicle body when the door assembly closes the door opening.

10. The door assembly of claim 9, wherein a body molding is secured to the body panel at the door opening; and wherein the lip seal portion seals against the body molding when the door assembly closes the door opening.

11. The door assembly of claim 1, wherein the header portion of the door inner panel has an aperture, and further comprising:
    a bulb seal secured to the header portion; and
    wherein the bulb seal is configured to seal against the vehicle body when the door assembly closes the door opening.

12. The door assembly of claim 1, wherein a length of the second planar flanges is not greater than about 6 millimeters.

13. The door assembly of claim 12, wherein the door inner panel and the reinforcement panel are aluminum.

\* \* \* \* \*